United States Patent [19]
Woerner et al.

[11] Patent Number: 5,176,233
[45] Date of Patent: * Jan. 5, 1993

[54] APPARATUS FOR REDUCING VEHICLE DRIVE TRAIN VIBRATIONS

[75] Inventors: Guenter Woerner, Kernen; Ernst Tscheplak, Weinstadt; Franz Moser, Wendlingen, all of Fed. Rep. of Germany

[73] Assignee: Daimler-Benz AG, Fed. Rep. of Germany

[ * ] Notice: The portion of the term of this patent subsequent to Jan. 30, 2007 has been disclaimed.

[21] Appl. No.: 870,348

[22] Filed: Jun. 4, 1986

Related U.S. Application Data

[63] Continuation-in-part of Ser. No. 829,508, Feb. 14, 1986, Pat. No. 4,724,719.

[30] Foreign Application Priority Data

Jun. 4, 1985 [DE] Fed. Rep. of Germany ....... 3519912
Dec. 23, 1985 [DE] Fed. Rep. of Germany ....... 3545857

[51] Int. Cl.$^5$ .......................... F16D 3/10; F16D 3/14; F16D 21/08
[52] U.S. Cl. ..................... 192/48.1; 74/574; 192/106.2; 464/46; 464/68
[58] Field of Search ................. 192/48.1, 106.2, 56 R, 192/48.7, 48.8, 48.3; 74/574; 464/68, 46, 66

[56] References Cited
U.S. PATENT DOCUMENTS

| | | | |
|---|---|---|---|
| 1,693,765 | 12/1928 | Parsons et al. | 74/574 X |
| 4,274,524 | 6/1981 | Nakane | 192/56 R X |
| 4,611,701 | 9/1986 | Friedmann | 192/110 B |
| 4,724,719 | 2/1988 | Wërner et al. | 192/30 V X |

FOREIGN PATENT DOCUMENTS

| | | | |
|---|---|---|---|
| 2814059 | 10/1978 | Fed. Rep. of Germany . | |
| 3436012 | 4/1986 | Fed. Rep. of Germany ... | 192/106.2 |
| 258542 | 5/1928 | Italy | 192/105 C |
| 2000257 | 1/1979 | United Kingdom | 74/574 |
| 2153970 | 8/1985 | United Kingdom | 192/106.2 |
| 2157801 | 10/1985 | United Kingdom | 464/68 |

Primary Examiner—Rodney H. Bonck
Attorney, Agent, or Firm—Evenson, Wands, Edwards, Lenahan & McKeown

[57] ABSTRACT

An apparatus for reducing the transmission of vibrations from an engine to a transmission line having two flywheel elements capable of rotation relative to one another, the first element being drivingly connected to the engine and the second element being drivingly connected to the transmission line. The two flywheel elements are connected by a spring mounting and abutments. A first abutment of the spring mounting is frictionally connected with limited rotational capacity to the second flywheel element. The frictional contact between the first abutment and the second flywheel element is smaller than the frictional contact between the second abutment and the first flywheel element.

24 Claims, 4 Drawing Sheets

APPARATUS FOR REDUCING VEHICLE DRIVE TRAIN VIBRATIONS

This application is a continuation-in-part application of our copending application Ser. No. 829,508 filed on Feb. 14, 1986 and now issued as U.S. Pat. No. 4,724,719 on Feb. 16, 1988 and entitled FLYWHEELS WITH VIBRATION DAMPING MEANS.

BACKGROUND AND SUMMARY OF THE INVENTION

The present invention relates to an apparatus for reducing the transmission of engine induced vibration to the drive line. Such an apparatus is the subject matter of the commonly owned, earlier filed U.S. application Ser. No. 829,508, filed on Feb. 14, 1986 and now U.S. Pat. No. 4,724,719. The apparatus described in that application has a split flywheel, with the two flywheel elements arranged on the same axis. The flywheels are drivingly connected to one another by a spring mounting. One of the flywheels is connected to the engine, while the other flywheel is connected to the transmission. An abutment of the spring mounting allocated to one of the flywheel elements is arranged on a second abutment that is frictionally connected to this flywheel element. The second abutment is drivingly connected to the flywheel element, without limiting the rotational capacity of the second abutment relative to the flywheel element, while the strength of the frictional connection is greater than the maximum torque of the engine.

The drive system of a motor vehicle can be designed such that the resonant frequency if at all possible lies somewhat below the idling speed of the engine. Consequently, the resonant frequency is excited virtually only when starting the engine. Thus, travel operation is performed in the so-called hypercritical range, so that the frequency of the vibrations occurring in travel operation is generally considerably higher than the resonant frequency. Only relatively low vibrational amplitudes occur between the device or flywheel elements during travel, a transmission of the vibrations from the engine to the drive line or vice versa being prevented by the spring mounting between the flywheel elements. If, when starting the engine, the resonant range of the device or of the flywheel is run through, the device or flywheel elements execute comparatively large displacement movements relative to one another. However, these movements are effectively damped because the forces transmitted by the spring mounting between the device or flywheel elements exceed the strength of the frictional contact, so that the abutment part frictionally connected to a particular device or flywheel element slips relative to that element.

As long as the forces transmitted between the device or flywheel elements by the spring mounting—such as during the travel of a vehicle—are lower than the strength of the frictional contact, the spring mounting cannot exert any damping effect. This is desirable in the case of the relatively small displacement vibrations that occur in the hypercritical range. However, there are situations in which larger relative movements between the device or flywheel elements can occur even outside the resonant frequency of the drive line. This happens, for example, in the load change between coasting and drive of a vehicle. As the forces occurring in such a load change are often less than the strength of the frictional contact, a damping of the vibrations associated with the load change is not readily possible.

It is therefore an object of the invention to design an apparatus of the initially-mentioned type so that relative movements occurring between the device or flywheel elements are already effectively damped when the forces acting between the device and the flywheel elements in these relative movements are weaker than the maximum engine torque, but stronger than a threshold value to be specified. The maximum engine torque is a predetermined maximum rated engine torque for a particular engine.

This and other objects are achieved by a spring mounting with first and second abutments. The first abutment is frictionally connected with limited rotational capacity to the second flywheel element, while the second abutment, which is arranged on the first abutment, is frictionally connected to the first flywheel element. The frictional contact between the first abutment and the second flywheel element is smaller than the frictional contact between the second abutment and the first flywheel element.

The present invention allows one of the abutment parts to yield or break away even with relatively small torques, and consequently damp relative movements between the device or flywheel elements comparatively early. Only when there are very strong torques or extremely high vibration amplitudes of the relative movements between the device or flywheel elements does the other abutment also yield with a corresponding damping effect.

Thus, the invention ensures a progressive damping of the relative movements of the device or flywheel elements, so that the damping increases with increasing relative movements.

According to a preferred embodiment of the invention, the progressivity can be further improved by each abutment part being frictionally connected to one or both flywheel elements via one or more clutches affected by clearance, the clutches having in each case a different clearance so that, when there is correspondingly strong relative movement of the device or flywheel elements, the effects of the clutches come into action successively with corresponding increase of the respective frictional contact between the abutment part and the particular device or flywheel element.

In a further preferred embodiment of the invention, the abutments are annular discs, radially overlapping one another and having, in the overlap region, cut-outs or windows extending in peripheral direction and overlapping one another which accommodate helical compression springs which are arranged in peripheral direction. The face ends of the springs—seen in axial view—each passes through the planes of the disc. The annular discs forming the first abutment are frictionally connected in the region of their inner periphery by means of coupling laminae to the one device or flywheel element, while the annular discs forming the second abutment are frictionally connected in the region of their outer periphery by means of coupling laminae to the other device or flywheel element. This achieves a space-saving and easily assembled design.

At the same time, it is advantageous if the annular discs forming the first abutment in preferred embodiments have on their inner periphery radial projections which interact in the manner of stops, with clearance in peripheral direction, with counter-projections on the one device or flywheel element or a hub part of the same. It is also advantageous if the annular discs forming the second abutment have on their outer periphery corresponding projections which interact in the manner of stops, with clearance in peripheral direction, with counter-projections which are arranged on the other device or flywheel element or a peripheral rim of the same. In this way, the limited mobility of one of the abutment parts with respect to the allocated device or flywheel element can be ensured very simply.

Further objects, features, and advantages of the present invention will become more apparent from the following description when taken with the accompanying drawings, which show for purposes of illustration only, an embodiment constructed in accordance with the present invention.

DETAILED DESCRIPTION OF THE DRAWINGS

Figure 1:
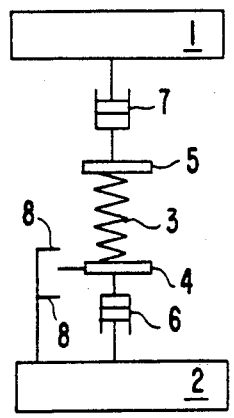
FIGS. 1 to 6 are schematic representations of various preferred embodiments of the present invention.

In FIG. 1, the two flywheel elements 1 and 2 are shown schematically as heavy bodies which are supported or coupled relative to one another by means of a spring mounting 3. The spring mounting 3 is clamped between two abutments 4 and 5, which are each frictionally connected by means of a slip clutch 6 and 7, respectively, to an allocated flywheel element 1 or 2. The slip clutches 6 and 7 are arranged in series with the spring mounting 3. The slip clutches 6 and 7 operate with different frictional contacts. In other words, the slip clutch 6 slips at relatively small torques, while the slip clutch 7 does not yield until there are torques greater than the maximum torque of the engine. The abutment 4 is arranged with limited mobility with respect to the flywheel element 2. The limited mobility is preset by the distance between stops 8. The abutment 5, on the other hand, has unlimited mobility with respect to the flywheel element 1 when the slip clutch 7 yields.

In actual operation, the flywheel elements 1 and 2 execute relative movements with respect to one another which are schematically represented in FIG. 1 as approach or withdrawal of the flywheel elements 1 and 2 towards or away from one another.

When only slight relative movements, (vibrations of low amplitude) occur between the flywheel elements 1 and 2, neither of the slip clutches 6 and 7 will slip so that the flywheel elements 1 and 2 move virtually undamped towards one another.

With stronger vibrational amplitudes and correspondingly higher torques acting between the flywheel elements 1 and 2, the slip clutch 6 is first to slip such that the abutment 4 moves relative to the flywheel 2. Consequently, relative movement between the flywheel elements 1 and 2 is damped along a greater or lesser travel distance by the frictional contact of the slip clutch 6.

With even stronger vibrational amplitudes, the travel distance available to the abutment 4 between the stops 8 is used up, so that the abutment 4 comes up against the stops 8. With corresponding apportionment of the frictional contact of the slip clutch 7, the latter will slip and, by damping the relative movements of the flywheel elements 1 and 2, limit the maximum torque transmitted between the flywheel elements 1 and 2.

Figure 2:
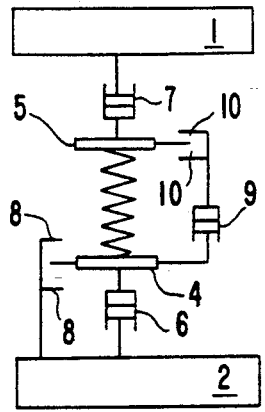

The arrangement according to FIG. 2 differs from that according to FIG. 1 in that a slip clutch 9 is arranged between the abutments 4 and 5. The slip clutch 9 is affected by clearance and which in each case only becomes active when the abutment 5 has used up a clearance available to it between stops 10. The slip clutch 9 thus acts in the manner of a stiffening of the spring mounting 3 when the abutments 4 and 5 are deflected to a greater extent relative to one another in one direction or the other.

The respective distances between the stops 8 and 10 and the frictional contacts of the slip clutches 6 and 9 are apportioned such that the slip clutches only slip when there is a correspondingly strong relative movement of the flywheel elements 1 and 2.

Figure 3:
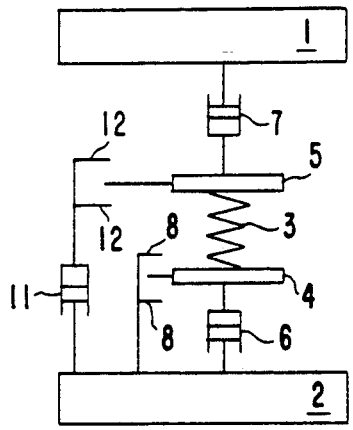

The embodiment illustrated in FIG. 3 differs from that shown in FIG. 1 in that the abutment 5 is also frictionally coupled via a slip clutch 11 affected by clearance to the flywheel element 2. The slip clutch 11 only becomes active when the movement space given to the abutment 5 between stops 12 has been used up.

Figure 4:
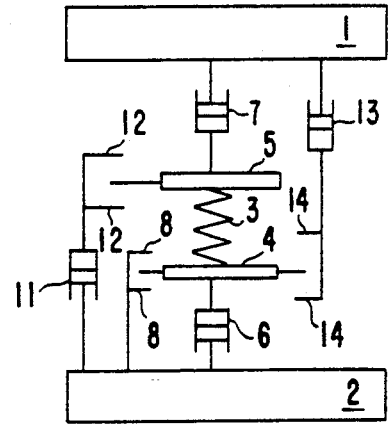

The embodiment of FIG. 4 provides that the abutment 4 is, compared with FIG. 3 embodiment, additionally frictionally connected to the flywheel element 1 by means of a slip clutch 13 affected by clearance. The effect of the slip clutch 13 is not active until the abutment 4 has used up the movement space remaining between stops 14.

The distances of the various stops 8, 12 and 14 and the torques transmitted by the respective slip clutches 6, 11 and 13 are designed such that the above slip clutches only slip successfully when there is correspondingly strong deflection of the flywheel elements 1 and 2 relative to one another. This achieves a correspondingly progressive damping of the relative movements of the flywheel elements 1 and 2.

Figure 5:
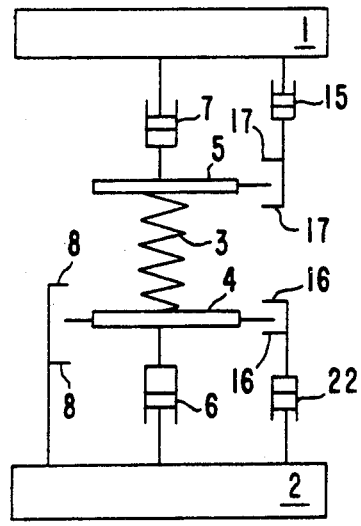

The embodiment according to FIG. 5 differs from the preceding embodiments in that the abutments 4 and 5 are additionally frictionally coupled to the respectively allocated flywheel elements 1 and 2 via slip clutches 22 and 15, which are both affected by clearance. The slip clutches 22 and 15 only become active after using up a movement clearance preset by stops 16 or 17 for the respective abutments 4 or 5. Here, too, the arrangement is again adapted such that there is correspondingly strong deflection of the flywheel elements 1 and 2 relative to one another until, with very large relative movements, all the slip clutches 6, 7, 22 and 15 slip.

Figure 6:
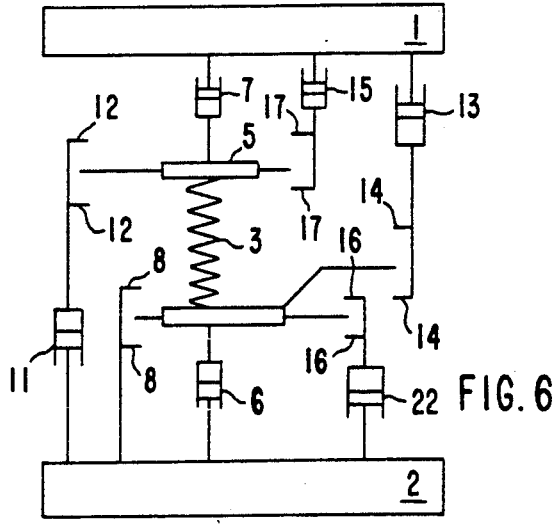

It can be seen from the embodiment of FIG. 6 that the arrangements according to FIGS. 4 and 5 can be combined. Also, still another arrangement incorporating the features of FIG. 2 is contemplated. However, for reasons of clarity, this has not been shown in FIG. 6.

Figure 7:
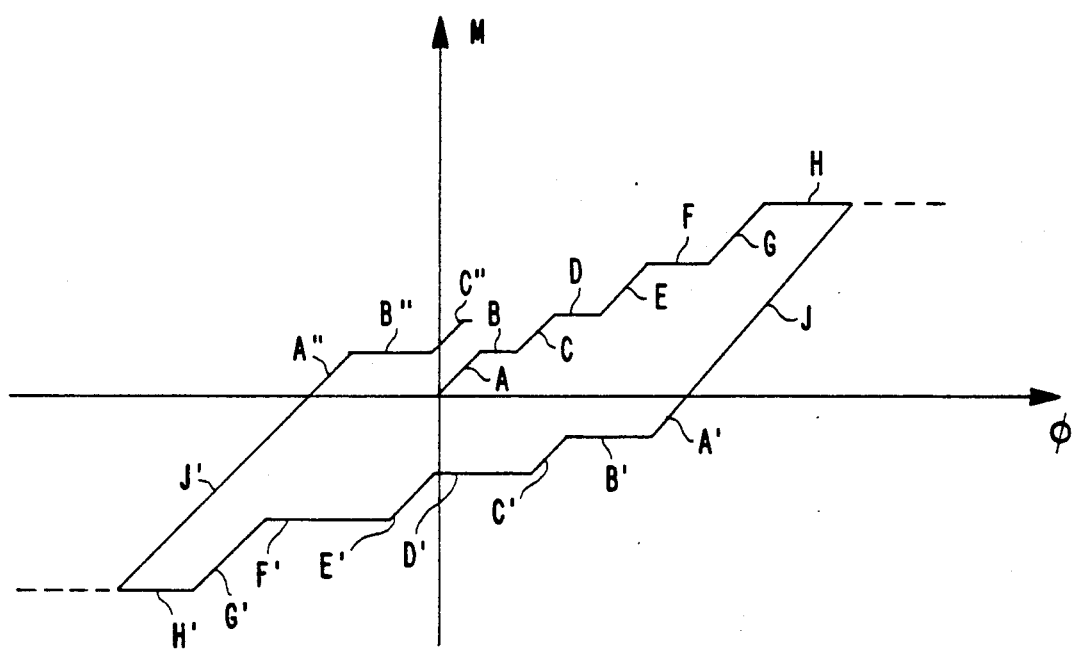
FIG. 7 is a diagram relating torque to be overcome by the flywheel elements to the relative deflection of the flywheel elements to one another, for apparatus connected in accordance with the embodiment of FIG. 5.

The diagram in FIG. 7 shows in detail the functional mode of the flywheel shown in FIG. 5. In this diagram, the torque M active or transmitted between the flywheel elements 1 and 2 is shown as a function of the displacement or rotation of the flywheel elements 1 and 2 relative to one another.

Assume the flywheel is located in the center position shown in FIG. 5. If the flywheel elements 1 and 2 are now rotated relative to one another—in the embodiment of FIG. 5 in an approach direction—only the resistance of the spring mounting 3 must be overcome at first, which sets up an increasing counter-movement against an increasingly relative rotation of the flywheel elements 1 and 2 according to the curve section A. Then the slip clutch 6 breaks away and slips according to a curve section B until the clearance available to the abutment 4 between the stops 16 had been used up. Then, with further rotation, the spring mounting 3 is increasingly tensioned according to the curve section C until the slip clutch 22 also slips according to the curve section D. As soon as the clearance available to the abutment 4 between the stops 8 has been used up, the spring mounting 3 is in turn increasingly tensioned according to the curve section E until the maximum torque between the flywheel elements 1 and 2 transmittable by the slip clutch 7 acts and the slip clutch 7 slips according to the curve section F. As soon as the clearance available to the abutment 5 between the stops 17 has been used up, the spring mounting 3 is once again increasingly tensioned according to the curve section G until the resistance of the slip clutch 15 is also overcome according to the curve section H.

As soon as the relative movement between the flywheel elements 1 and 2 in the specified direction has come to a standstill, the spring mounting 3 can relax according to the curve section J. The previously described sequence of movements can then proceed in the reverse direction. It must be noted here that the abutments 4 and 5 in each case assume an end position between the stops 8, 16 and 17 and can consequently be displaced in the reverse direction along relatively large travel distances B', D' and F', respectively. Moreover, the same relationship described above applies analogously in the displacement of the flywheel elements 1 and 2 in the reverse relative direction. With a renewed direction reversal, the abutments 4 and 5 can move between the stops 8, 16 and 17, again along relatively large travel distances B'', D'', etc., which have the same length as the travel distances A', B', etc.

Figure 8:
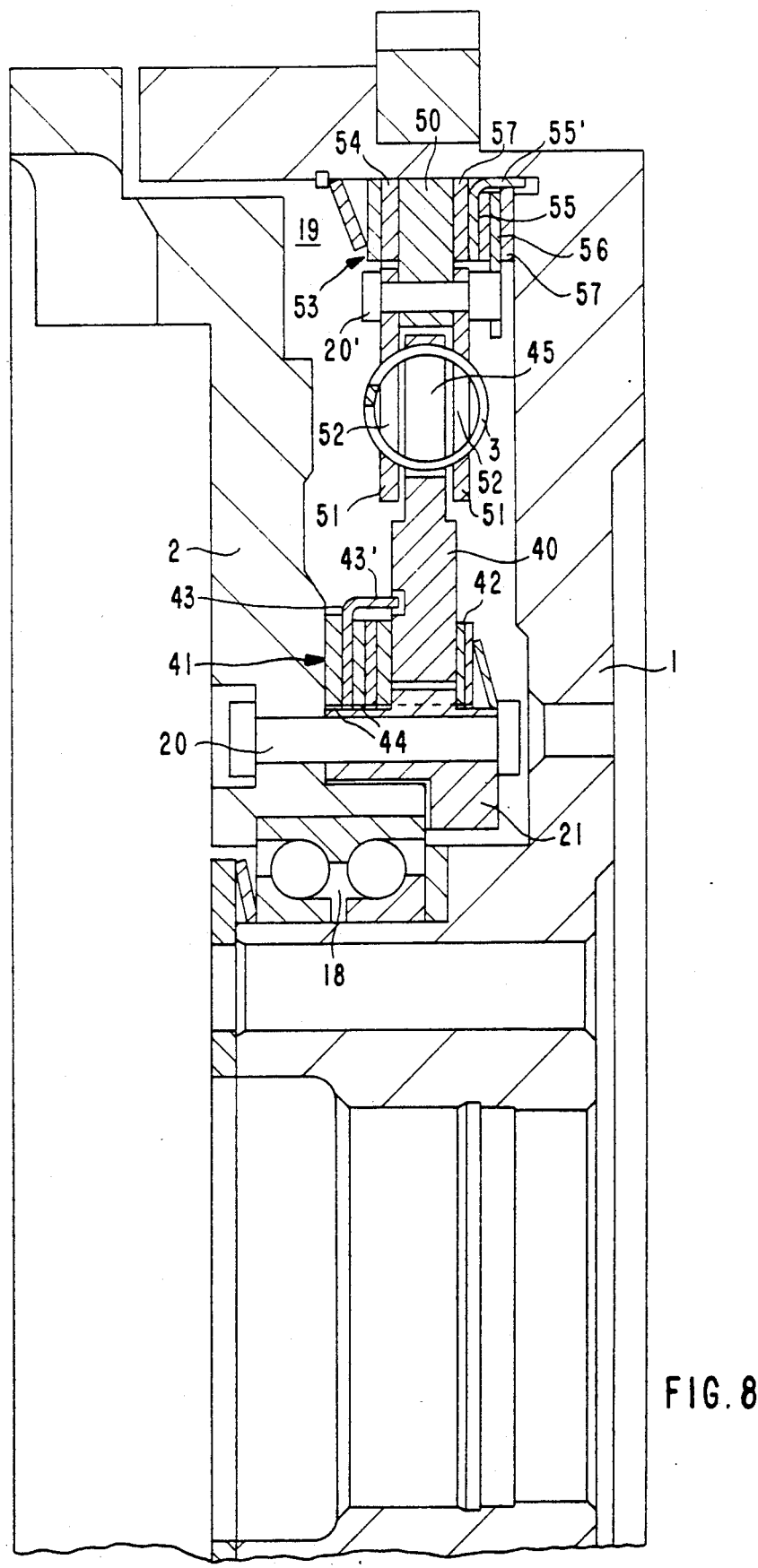
FIG. 8 is an axial sectional view of a preferred construction of the embodiment of FIG. 5.

FIG. 8 shows an axial section of an embodiment of the flywheel according to the invention corresponding to the embodiment shown in FIG. 5.

The flywheel element 1 is connected in a driven manner to the engine (not shown). The flywheel element 2 is rotatably mounted on the flywheel element 1 by means of a bearing arrangement 18 and can be connected in a driven manner by a clutch (not shown) to the input shaft of a drive line or a vehicle transmission (also not shown).

Between the flywheel elements 1 and 2 there remains an annular space 19 which serves to accommodate the spring mounting 3 and its abutments, which are each frictionally connected to a flywheel element 1 and 2, respectively, as explained further below.

The first abutment is formed by an annular disc 40 which has on its inner periphery radial projections or recesses which interact with corresponding projections or recesses on a hub part 21 firmly connected by pins 20 to the flywheel element 2. In this embodiment, the recesses and projections are arranged on the hub part 21 and the annular disc 40, respectively, with adequate clearance such that the annular disc 40 has limited rotational capacity relative to the flywheel element 2, interacting with the abutment part 4.

The annular disc 40 is frictionally connected in the region of its inner periphery by means of a clutch arrangement 41 to the flywheel element 2 and the hub part 21. The coupling arrangement 41 is progressively designed, so that the strength of the frictional contact increases with increasing deflection of the annular disc 40 from a center position relative to the flywheel element 2. For this purpose, the annular disc 40 is frictionally connected to friction laminae 42 fixed relative to the flywheel element 2. The friction laminae 42 always set a given resistance against a displacement of the annular disc 40 relative to the flywheel element 2 or the hub part 21.

Furthermore, the annular disc 40 is positively connected to an annular lamina 43, but with clearance, which is less than the movement clearance of the annular disc 40 relative to the hub 21 or to the flywheel element 2. In addition, the annular lamina 43 has on its outer periphery bent-off portions 43' which engage in lateral recesses on the annular disc 40. The recesses on the annular disc 40 extended greater in peripheral direction than the bent-off portions 43' to allow the annular lamina 43 the required clearance relative to the annular disc 40. The annular lamina 43 interacts with other annular laminae 44, which establish a frictional connection between the flywheel element 2 or the hub part 21 and the annular lamina 43.

If, therefore, the annular disc 40 is displaced relative to the flywheel element 2, only the frictional contact which is generated by the friction laminae 42 has to be overcome at first. With larger deflection angles, the frictional contact between the annular lamina 43 and the hub part 21 or the flywheel element 2 has to be additionally overcome.

In the vicinity of the outer periphery, the annular disc 40 has windows 45 extending in peripheral direction in which helical compression springs serving as a spring mounting 3 are inserted with or without pretension.

Arranged at the side of the window region of the annular disc 40 are annular webs 51 which are fixed—by means of pins or the like—to an annular disc 50 which for its part is arranged concentrically to the annular disc 40. In the annular webs 51 are arranged windows 52 corresponding to the windows 45 of the annular disc 40 and accommdating areas of the helical compression spring 3.

In a central position of the annular discs 40 and 50, the windows 45 and 52 lie opposite and in line with one another, so that the two ends to each helical compression spring 3 bear in each case against the radial edges of the windows 45 and 52. If the annular discs 40 and 50 are deflected out of their central position relative to one another, the windows 45 and 52 can only partially overlap, so that the helical compression springs are increasingly compressed, the one end of each helical compression spring bearing only against a radial edge of the window 45 and the other end only against radial edges of the windows 52. Thus, the helical compression springs 3 are increasingly tensioned if the annular discs 40 and 50 are deflected relative to one another more or less in one direction or the other.

At its radial outer edge, the annular disc 50 is frictionally connected merely—by means of a clutch arrangement 53—to the flywheel element 1, so that when the frictional contact is overcome, the annular disc 50 can be rotated as far as desired relative to the flywheel element 1.

The clutch arrangement 53 is, in turn, progressively designed, so that a smaller frictional contact is effective at small deflection angles between annular disc 50 and flywheel element 1 than at larger deflection angles.

For this, the annular disc 50 is constantly, or independently of the displacement angle, frictionally coupled via friction laminae 54 and 57 to the flywheel element 1. Thus, this frictional contact is effective at any relative displacement between annular disc 50 and flywheel element 1.

Furthermore, an annular lamina 55 is positively connected to the flywheel element 1 by bent-off portions 55' on the outer periphery of the annular lamina 55 being axially displaced in recesses on the flywheel element 1, but engaging free of clearance in peripheral direction. In addition, the annular disc 50 is positively connected, but with clearance, to another annular lamina 56, which has in the region of its inner periphery, windows extending in peripheral direction, in which the pins 20' or their heads are accommodated with clearance in peripheral direction.

The annular lamina 56 interacts with other friction laminae 57, so that, after using up the movement clearance of the annular lamina 56 relative to the annular disc 50, in each case as additional frictional contact comes into action between the flywheel element 1 and the annular disc 50.

In the arrangement shown, the coupling arrangement 41 has overall a frictional contact which is smaller than the maximum torque of the engine, while the coupling arrangement 53 can, once the clearance between the pin 20' and the annular lamina 56 has been used up, only be rotated further if the torque acting exceeds the maximum engine torque.

Figure 9:
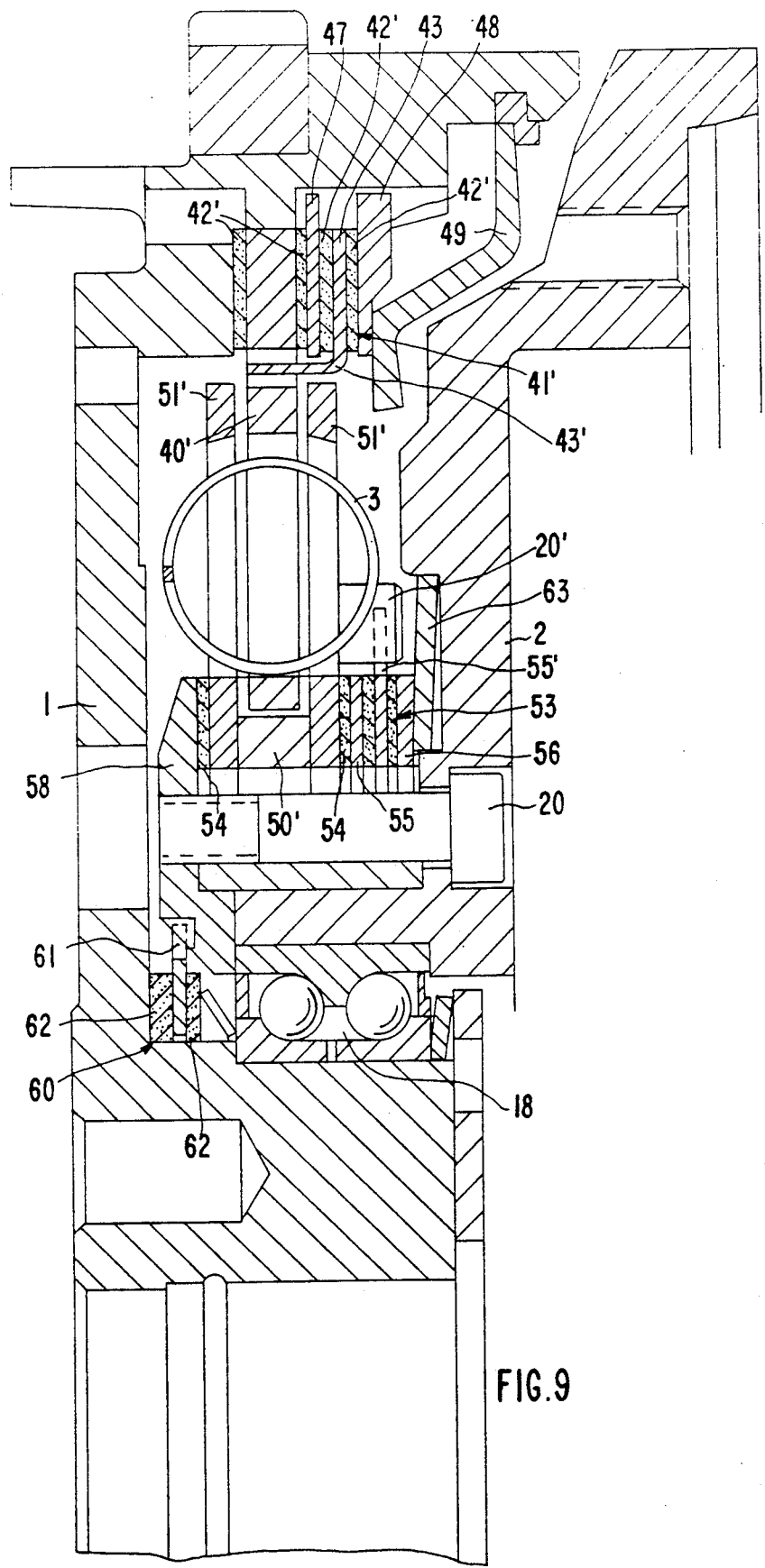
FIG. 9 is an axial sectional view of a second preferred construction of the embodiment of FIG. 5.

The embodiment illustrated in FIG. 9 differs from that of FIG. 8 in that the flywheel elements 1 and 2 are directly coupled to one another via a clutch 60 affected by clearance. For this, an annular lamina 61 is positively connected in peripheral direction, but with clearance, to the flywheel element 2 by radial projections or recesses being arranged on the outer periphery of the annular lamina 61 which interact with recesses or projections on the flywheel element 2 and ensure the required clearance. The annular lamina 61 is, for its part, arranged between friction laminae 62 which are mounted on the flywheel element 1. The clutch 60 thus allows the flywheel element 2 a free movement space relative to the flywheel element 1 corresponding to the clearance between the annular lamina 61 and the flywheel element 2. As soon as the clearance has been used up in one direction or the other, the relatively weak frictional contact of the clutch 60 is effective between the flywheel elements 1 and 2.

The clutch 41' acts in the embodiment of FIG. 9 between the radially outer region of the annular disc 40' and the flywheel element 1. The annular disc 40' is axially displaceable on the flywheel element 1 and arranged rotatably relative to the flywheel element 1 between friction laminae 42', one of which is directly adjacent to the flywheel element 1, while the other friction lamina is adjoined by an annular lamina 47 which is axially movable relative to the flywheel element 1 but is mounted non-rotatably. Arranged between two other friction laminae 42', which for their part are arranged between the annular lamina 47 and an annular disc 48, is the annular lamina 43 which engages bent-off portions 43' on its inner periphery in openings of the annular disc 40'. These openings of the annular disc 40' are apportioned in peripheral direction such that the said bent-off portions 43' have a clearance is peripheral direction. The entire arrangement described is pressed together in axial direction of the flywheel element 1 by means of a spring ring 49, which has an S-like cross-section and is tensioned by its radial inner region against the radial inner region of the annular disc 48.

As long as the clearance of the bent-off portions on the annular lamina 43 in the recesses or openings in the annular disc 40' have not yet been used up, the annular disc 40' can, with adequate torques, be rotated relative to the flywheel element 1 without the annular lamina 43 turning with it. As soon as the clearance between the annular lamina 43 and the annular disc 40' has been used up, the annular disc 40' can only keep rotating by using an increased force relative to the flywheel element 1. In this arrangement, the frictional contact is expediently apportioned such that is exceeds the maximum torque of the engine.

The annular disc 50' and the annular webs 51' are axially displaceable by their inner periphery and arranged movably on the flywheel element 2 with clearance in peripheral direction. At the same time, the clearance in peripheral direction is limited by recesses arranged on the inner periphery of the annular disc 50' or of the annular webs 51', which interact in the manner of stops with the studs 20. Arranged on either side of the annular webs 51' are friction laminae 54, which interact with one of the annular webs 51' and also with an annular part 58 and an annular lamina 55.

The annular part 58 is connected by means of the studs 20 non-rotatably with the flywheel element 2, while the annular lamina 55 is arranged axially displaceably, but is immovable in peripheral direction because it clasps the studs 20 by means of recesses on its inner periphery. An annular lamina 55' is arranged between two other friction laminae. This annular lamina 55' has on its outer periphery projections which clasp a pin 20' on one of the annular webs 51', with clearance in peripheral direction, so that the annular lamina 55' can be rotated by a limited travel distance relative to the annular webs 51'. In this arrangement, the movement clearance between the annular lamina 55' and the annular webs 51' is smaller than the movement clearance of the annular webs 51' relative to the flywheel element 2.

Towards the flywheel element 2, another annular lamina 56 arranged in the same way as the annular lamina 55. The entire clutch 53 is axially compressed by means of a spring washer 63. As long as the movement clearance between the annular webs 51 on the one hand and the annular lamina 55' has not yet been used up, the annular webs 51' can, as long as the movement clearance relative to the flywheel element 2 permits, rotate relative to the flywheel 2 without simultaneous movement of the annular lamina 55'. After using up the clearance between the annular webs 51' and the annular lamina 55', an increased resistance must be overcome if the annular webs are to rotate relative to the flywheel element 2. For this, the maximum frictional contact of the clutch 53 is apportioned such that the annular webs 51' are already displaced relative to the flywheel element 2 when torques act which are smaller than the maximum torque of the engine.

The embodiment is modified in a contemplated embodiment by the annular disc 40' having, for example on its outer periphery, projections or recesses which interact with recesses or projections on the flywheel element 1 in such a way that only a limited rotation of the annular disc 40' relative to the flywheel element 1 is possible. In this contemplated embodiment, this clearance is apportioned such that the clearance available to the annular disc 40' relative to the flywheel element 1 is greater than the clearance of the bent-off portions 43' of the annular lamina 43 in the recesses or openings of the annular disc 40'.

If the annular disc 40' is only capable of limited rotation relative to the flywheel element 1 in the way described, the annular disc 50' and the annular webs 51' are arranged to be capable of unlimited rotation relative to the flywheel element 2, such that no recesses or projections or the like which could interact with the pins 20 or other elements in the sense of a rotational travel distance limitation are arranged on the inner periphery of the annular disc 50' or the annular webs 51'.

Moreover, in the case of the last-described embodiment, the frictional contact of the clutch arrangement 53 is apportioned larger overall than the maximum torque of the engine, while the maximum frictional contact of the clutch 41' is smaller than the maximum engine torque.

Although the present invention has been described and illustrated in detail, it is to be clearly understood that the same is by way of illustration and exmple only, and is not to be taken by way of limitation. The spirit and scope of the present invention are to be limited only by the terms of the appended claims.

What is claimed is:

1. Apparatus for reducing the transmission of vibrations from an engine to a transmission line comprising:
   a divided flywheel having first and second flywheel elements, said first element being drivingly connected to the engine and said second element being drivingly connected to said transmission line.
   connecting means for drivingly connecting said two flywheel elements, said connecting means including:
   resilient means,
   first and second abutment means engageable with the resilient means,
   first and second frictional clutch means interposed between the flywheel elements and including friction contact surfaces for transmitting driving forces between said flywheel elements,
   wherein one of the clutch means is configured to permit relative rotation between said flywheel elements in response to forces above a predetermined threshold level which is below the maximum torque of the engine,
   wherein said one of said clutch means includes at least one surface of said first abutment means and frictional connection means for frictionally connecting said first abutment means with said second flywheel element, said first abutment means having limited rotational capacity with respect to the second flywheel element, and
   wherein the other of said clutch means includes at least one surface of said second abutment means and frictional connection means for frictionally connecting said second abutment means with said first flywheel element, said second abutment means being concentric with said first abutment means.

2. Apparatus according to claim 1, wherein at least one of said first and second abutments is progressively frictionally connected to at least one of said flywheel elements.

3. Apparatus according to claim 2, further including a first additional clutch for frictionally connecting said first and second abutments, wherein said first additional clutch is connected to stops, a space between said stops defining a clearance, and wherein said first additional clutch becomes active when said clearance is used up.

4. Apparatus according to claim 3, further including a plurality of additional clutches for frictionally connecting at least one of said first and second abutments to at least one of said first and second flywheel elements wherein said plurality of additional clutches are connected to stops, with spaces between said stops defining additional clearances, and wherein said additional clutches become active when said additional clearances are used up.

5. Apparatus according to claim 1, wherein said resilient means includes helical compression springs mounted in spring mounting means.

6. Apparatus according to claim 5, wherein said first and second abutments are annular discs which radially overlap one another, each having overlapping cut-outs extending in peripheral direction for accommodating said helical compression springs.

7. Apparatus according to claim 6, wherein said helical compression springs are arranged in peripheral direction, having face ends which extend beyond the planes of said annular discs.

8. Apparatus according to claim 6, wherein one of said clutch means includes coupling laminae for frictionally connecting the annular discs of the first abutment at the inner periphery of said annular discs to said second flywheel element.

9. Apparatus according to claim 6, wherein one of said clutch means includes coupling laminae for frictionally connecting the annular discs of the second abutment at the outer periphery of said annular discs to said first flywheel element.

10. Apparatus according to claim 6, wherein said second flywheel element has projections, and said annular discs of said first abutment have on their inner periphery projections which interact with said second flywheel element projections in the manner of stops, with clearance in peripheral direction.

11. Apparatus according to claim 10, wherein said annular disc projections are radial.

12. Apparatus according to claim 11, wherein said second flywheel element has a hub part on which said second flywheel element projections are arranged.

13. Apparatus according to claim 6, wherein said first flywheel element has projections, and said annular discs of said second abutment have on their outer periphery projections which interact with said first flywheel element projections in the manner of stops, with clearance in peripheral direction.

14. Apparatus according to claim 13, wherein said first flywheel element has a peripheral rim on which said first flywheel element projections are arranged.

15. Apparatus according to claim 1, further including a direct coupling clutch for directly coupling said first and second flywheel elements, wherein said direct coupling clutch is connected to stops, a space between said stops defining a clearance, and wherein said direct coupling clutch becomes active when said clearance is used up.

16. Apparatus according to claim 1, wherein the frictional contact force between the first abutment means and the second flywheel element is smaller than the frictional contact force between the second abutment means and the first flywheel element.

17. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches being operative to oppose all angular movements of said first and second flywheels relative to each other and including an input element having two confronting friction surfaces arranged to rotate with one of said flywheels and an output element disposed between and in frictional engagement with said surfaces, said elastic damper having an input element receiving torque from said output element, an output element arranged to transmit torque to the other of said slip clutches, and at least one energy storing resilient element between the input and output elements of said elastic damper;

wherein the input element of said elastic damper is rigid with the output element of said one slip clutch;

wherein said other slip clutch has an input element which is rigid with the output element of said elastic damper and an output element which is arranged to rotate with the other of said flywheels;

wherein the output element of said one slip clutch comprises a disc-shaped flange having a radially outer portion between said friction surfaces and a radially inner portion constituting the input element of said elastic damper, the output element of said elastic damper including two coaxial discs having radially outer portions flanking the radially inner portion of said flange and radially inner portions constituting the input element of said other slip clutch.

18. The apparatus of claim 7, wherein the radially inner portion of said flange and the radially outer portions of the discs of the output element of said elastic damper have registering windows for said energy storing element.

19. The apparatus of claim 17, wherein the radially inner portions of the discs of the output element of said elastic damper are adjacent each other and are arranged to rotate as a unit.

20. The apparatus of claim 17, wherein at least one of said discs is dished and said inner and outer portions of said one disc resemble washers which are offset relative to each other in the direction of the common axis of said flywheels.

21. The apparatus of claim 17, wherein said discs are mirror symmetrical to each other with reference to a plane extending at right angles to the common axis of said flywheels.

22. The apparatus of claim 17, further comprising means, particularly one or more fastening means, for non-rotatably connecting said discs to each other.

23. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches being operative to oppose all angular movements of said first and second flywheels relative to each other and including an input element having two confronting friction surfaces arranged to rotate with one of said flywheels and an output element disposed between an in frictional engagement with said surfaces, said elastic damper having an input element receiving torque from said output element, an output element arranged to transmit torque to the other of said slip clutches, and at least one energy storing resilient element between the input and output elements of said elastic damper;

wherein the input element of said elastic damper is rigid with the output element of said one slip clutch;

wherein said other slip clutch has an input element which is rigid with the output element of said elastic damper and an output element which is arranged to rotate with the other of said flywheels;

wherein the input element of said other slip clutch is rotatable relative to said other flywheel and said other flywheel comprises means for limiting the extent of rotary movement of the input element of said other slip clutch relative to said other flywheel;

wherein said limiting means comprises a pair of spaced-apart surfaces provided on said other flywheel and a further projection provided on the input element of said other slip clutch between the projections of said pair of projections.

24. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches being operative to oppose all angular movements of said first and second flywheels relative to each other and including an input element having two confronting friction surfaces arranged to rotate with one of said flywheels and an output element disposed between and in frictional engagement with said surfaces, said elastic damper having an input element receiving torque from said output element, an output element arranged to transmit torque to the other of said slip clutches, and at least one energy storing resilient element between the input and output elements of said elastic damper;

wherein the input element of said elastic damper is rigid with the output element of said one slip clutch;

wherein said other slip clutch has an input element which is rigid with the output element of said elastic damper and an output element which is arranged to rotate with the other of said flywheels;

wherein the output element of said other slip clutch comprises two confronting friction surfaces arranged to rotate with said other flywheel and the input element of said other slip clutch comprises at least one disc which is disposed between and is in frictional engagement with said surfaces:

wherein the output element of said other slip clutch comprises two coaxial discs one of which is movable axially toward the other of said discs and means, particularly one or more fastening means for non-rotatably securing said discs to said other flywheel;

wherein the input element of said other slip clutch has at least one recess receiving and securing means with freedom of limited angular movement of the input element of said other slip clutch relative to said other flywheel.

* * * * *